E. BAUER.
SPARK PLUG FOR INTERNAL COMBUSTION ENGINES.
APPLICATION FILED OCT. 26, 1911.
1,127,390.
Patented Feb. 9, 1915.
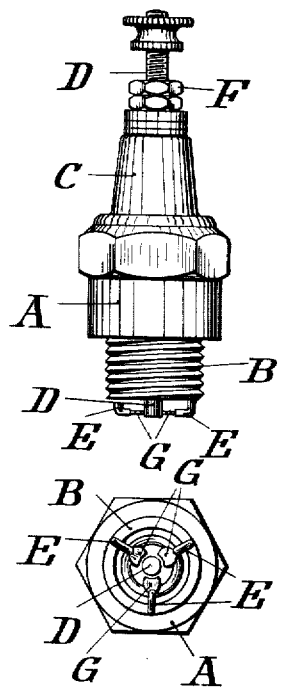
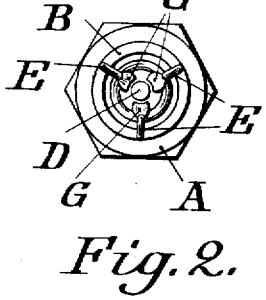
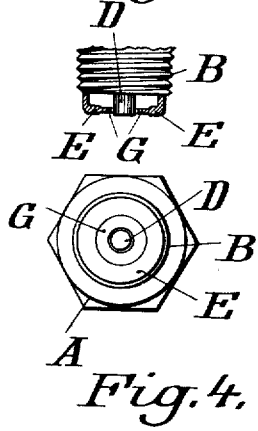
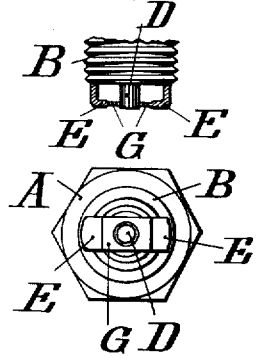
WITNESSES
INVENTOR
Eugen Bauer
By Pennie, Davis & Goldsborough
Attys

UNITED STATES PATENT OFFICE.

EUGEN BAUER, OF STUTTGART, GERMANY, ASSIGNOR TO THE FIRM OF ROBERT BOSCH, OF STUTTGART, GERMANY.

SPARK-PLUG FOR INTERNAL-COMBUSTION ENGINES.

1,127,390.     Specification of Letters Patent.     Patented Feb. 9, 1915.

Application filed October 26, 1911. Serial No. 656,958.

*To all whom it may concern:*

Be it known that I, EUGEN BAUER, a subject of the Emperor of Germany, and residing at Kornbergstrasse 11ª, Stuttgart, Germany, have invented certain new and useful Improvements in Spark-Plugs for Internal-Combustion Engines; and I do hereby declare the following to be a full, clear, and exact description of the invention, such as will enable others skilled in the art to which it appertains to make and use the same.

This invention relates to spark plugs for internal combustion engines, and more particularly to one of the high tension or jump spark type, which assures satisfactory ignition of the combustible mixtures throughout a long period of operation without special attention, by providing such construction and arrangement that one or both of the electrodes of the plug becomes momentarily incandescent so as to burn away any residue deposited thereon, but does not remain incandescent long enough to give rise to ignition at undesired times.

In order to provide satisfactory ignition at all times it is essential that no solid or semi-liquid residue resulting from combustion of the combustible mixtures be allowed to remain on the electrodes, inasmuch as such residue would tend to bridge over the spark gap and cause the spark-plug to fail to operate. It would be possible to avoid that defect by so constructing the electrodes that at least one of them becomes incandescent during the combustion of the gases so that any residue previously deposited on the electrode is burned to a non-conducting ash. However, if such procedure is adopted it is necessary to avoid the attendant disadvantage arising from the circumstance that if the electrode remains incandescent for an extended part of the period between successive sparks the combustible mixture may be ignited prematurely, for instance in the compression stroke of the engine.

In accordance with my invention, both of these essential requirements are simultaneously fulfilled in a satisfactory manner by a construction involving such form and such material that the heat during each combustion period raises the temperature of one or both of the electrodes of the spark plug sufficiently high to burn the residue deposited thereon to a non-conducting ash; and at the same time the heat is dissipated from the heated part at a rate which quickly lowers the temperature below the temperature of ignition of the combustible mixture, whereby the part remains heated above the temperature of ignition for so short a time that premature ignition is impossible.

In the drawings, illustrating several forms of construction in accordance with my invention, Figure 1 is a side view and Fig. 2 a bottom view of the spark plug showing particularly the form of the incandescent electrode; Fig. 3 is a side view of the lower part of a plug and Fig. 4 a bottom view thereof, wherein the form of the incandescent electrode is modified; Figs. 5 and 6 are similar to Figs. 3 and 4 except that the form of the incandescent electrode is again modified.

The socket A of the spark plug is provided with a threaded nipple B adapted to be screwed into the cylinder of the internal combustion engine, and it incloses a body of insulating material C. The insulated electrode D extends centrally through the insulating body C and is adjustably fastened therein by the nuts F so that its other end projects centrally in proximity to one or more electrodes E attached to the inside on the nipple B by soldering, swaging, or otherwise, as is well known.

In all cases the electrode E, G is made of a metal that strongly resists fusion, such as nickel or the like, so that it may be heated to a temperature of incandescence without material softening.

In Figs. 1 and 2, I show a plurality of radially disposed electrodes F of wire, having flattened sparking parts G which extend partly around the insulated electrode D but are separated therefrom by the proper spark gap. These electrodes are not merely cut off from wire and given a circular edge, but their ends are so formed by flattening them that at each sparking period the parts G become incandescent and are thereby in condition to burn themselves clean, but that, on the other hand, in consequence of their large surface and small mass and also in consequence of the comparatively large mass of the parts E, the heat of the sparking parts is so quickly dissipated that they are again cooled, sufficiently to prevent ignition by incandescence, before the following compression stroke.

In Figs. 3 and 4, the electrode E, G has a flattened annular part G inclosing the insulating electrode D and being separated therefrom by the proper spark gap as before.

In Figs. 5 and 6, the electrode E, G, has the flattened sparking part G with a central hole through which extends the insulated electrode D.

In all of these modifications the parts E, which are massive compared with the sparking parts G, are provided for the purpose of aiding in the rapid dissipation of the heat from the sparking parts of the electrodes, as is also the case in the modification shown in Figs. 1 and 2.

In each case the electrode E is so formed that the flattened part G becomes incandescent at the period of ignition, and during the period of combustion the combustion residues deposited are consumed to a nonconducting ash so that no bridging over of the spark gap takes place; but because of its large radiating surface and small mass the electrode, in the further course of the explosion period and during the discharge period, is so far cooled that no ignition by incandescence can take place at an undesired time.

Having thus described my invention what I claim is:—

1. In a spark plug for internal combustion engines, two electrodes separated from each other by a spark gap, one of said electrodes having a flat sparking part of comparatively small mass so as to become incandescent at the ignition period, whereby combustion residues deposited thereon are consumed, and also having a comparatively massive part to aid in dissipating the heat at a rate which quickly lowers the temperature of the sparking part below the temperature of ignition of the combustible mixture whereby ignition by incandescence at an undesired time is avoided; substantially as described.

2. In a spark plug for internal combustion engines, an electrode extending centrally through the plug and being insulated therefrom, and a second electrode electrically connected to the plug and separated from the other electrode by a spark gap, the second electrode having a flat sparking part extending in an arc concentric with the first mentioned electrode, said sparking part having a comparatively small mass so as to become incandescent at the ignition period, whereby combustion residues deposited thereon are consumed, and the second electrode also having a comparatively massive part to aid in dissipating the heat at a rate which quickly lowers the temperature of the sparking part below the temperature of ignition of the combustible mixture, whereby ignition by incandescence at an undesired time is avoided; substantially as described.

3. In a spark plug for internal combustion engines, an electrode extending centrally through the plug and being insulated therefrom, and a second electrode entirely surrounding the first mentioned electrode and being electrically connected to the plug, said second electrode having a flat sparking part of comparatively small mass so as to become incandescent at the ignition period, whereby combustion residues deposited thereon are consumed, and the second electrode also having a comparatively massive part to aid in dissipating the heat at a rate which quickly lowers the temperature of the sparking part below the temperature of ignition of the combustible mixture, whereby ignition by incandescence at an undesired time is avoided; substantially as described.

In testimony whereof I affix my signature, in presence of two witnesses.

EUGEN BAUER.

Witnesses:
 REINHOLD ELWERT,
 PAUL WOLFART.

Correction in Letters Patent No. 1,127,390.

It is hereby certified that in Letters Patent No. 1,127,390, granted February 9, 1915, upon the application of Eugen Bauer, of Stuttgart, Germany, for an improvement in "Spark-Plugs for Internal-Combustion Engines," an error appears in the printed specification requiring correction as follows: Page 1, line 93, for the reference-letter "F" read $E$, $G$; and that the said Letters Patent should be read with this correction therein that the same may conform to the record of the case in the Patent Office.

Signed and sealed this 11th day of May, A. D., 1915.

[SEAL.]

R. F. WHITEHEAD,

*Acting Commissioner of Patents.*